United States Patent

Gerbier et al.

[15] 3,661,648

[45] May 9, 1972

[54] PREPARATION OF CUPROUS CHLORIDE ELECTRODES

[72] Inventors: Gerard Marcel Gerbier, Biard; Victor Louis Dechenaux, Poitiers, both of France

[73] Assignee: Societe des Accumulateurs Fixes et de Traction (Societe Anonyme),, Romainville, France

[22] Filed: July 31, 1970

[21] Appl. No.: 60,154

[30] Foreign Application Priority Data

July 31, 1969 France..................................6926329

[52] U.S. Cl..............................136/120, 75/200, 117/230, 148/6.14, 156/18
[51] Int. Cl.......................................................H01m 13/08
[58] Field of Search................136/23, 83 R, 100 R, 100 M, 136/120 R, 137; 148/6, 6.14, 6.31, 6.14; 117/230; 75/200; 252/79.4; 156/18, 3

[56] References Cited

UNITED STATES PATENTS

| | | | |
|---|---|---|---|
| 3,415,687 | 12/1968 | Methlie | 136/83 R |
| 3,531,328 | 9/1970 | Bro et al | 136/120 R |
| 2,744,948 | 5/1956 | Salauze | 136/100 R |

*Primary Examiner*—Winston A. Douglas
*Assistant Examiner*—M. J. Andrews
*Attorney*—Kenyon & Kenyon Reilly Carr & Chapin

[57] ABSTRACT

Electrodes for electrochemical cells are prepared from porous copper-containing carrier bodies by immersion at ambient temperature of such bodies in cupric chloride dissolved in an organic non-aqueous solvent such as methanol and subsequently washed in an organic compound capable of dissolving cupric chloride, e.g. methanol to remove excess cupric chloride and then dried in vacuo.

The porous carrier bodies may be prepared by sintering arborescent copper powder selected from the group consisting of acicular form or dendritic form having an apparent density of between 1 and 2 first molded to desired shape then heated to about 700° C. in a reducing atmosphere for about one half hour. A conductive copper or copper plated support of metal gauge or perforated metal sheet may be incorporated in the powder during molding.

In the alternative the copper carrier body can be molded from such copper powders agglomerated with an organic binder selected from the group consisting of polystyrene, polyethylene and polytetrafluoroethylene and this molded body immersed in cupric chloride dissolved in organic solvent such as methanol, with subsequent washing in organic compound such as methanol to remove excess cupric chloride and ultimate drying in vacuo.

Electrodes and electrochemical cells utilizing said electrodes are also described.

14 Claims, No Drawings

PREPARATION OF CUPROUS CHLORIDE ELECTRODES

RELATED APPLICATIONS

A related application Ser. No. 59,514 filed July 30, 1970 is copending.

BACKGROUND OF INVENTION

The present invention concerns a method for preparing a cuprous chloride electrode. Such an electrode can be used as a positive electrode in numerous types of electrochemical cells and more particularly as a cathode in a primary cell with a lithium anode and a non-aqueous electrolyte.

A method for preparing such an electrode is known through the U. S. Pat. No. 2,744,948 of May 5, 1956 and entitled "- Primable Electric Batteries Employing Cuprous Chloride." This method consists in providing a sintered copper carrier which is submitted to the action of a boiling concentrated aqueous solution of cupric chloride. The metallic copper of the carrier then reacts with the cupric chloride to yield cuprous chloride according to the following reaction, which is the reverse of the cuprous chloride dis-proportionation reaction:

$$Cu + CuCl_2 \rightleftarrows 2 CuCl$$

Although this is, in principle, an equilibrium reaction, experience shows that if the operation is repeated several times, the original sintered copper carrier can be very greatly enriched in cuprous chloride, and sometimes even, over enriched, to the detriment of the metallic copper carrier, whose presence as a current collector is necessary for the proper operation of the electrodes.

Resulting cuprous chloride electrodes can, moreover, contain traces of moisture which are difficult to remove, this being another possible draw-back if they are used in electrochemical cells with non-aqueous electrolyte, for example, in cells comprising a lithium negative electrode.

Objects and features of the present invention are, more particularly, to eliminate the above drawbacks resulting from the practice of the method of said earlier patent.

Other objects and features of the invention will become apparent from the following detailed description by way of illustration but without limitation to the specific details presented.

BRIEF SUMMARY OF INVENTION

The invention comprises a method for preparing a cuprous chloride electrode according to which a porous carrier containing copper is submitted to the action of a non-aqueous concentrated cupric chloride solution, characterized in that the said solution besides containing no water, is formed by dissolving the cupric chloride in an organic solvent, for example, an alcohol, the reaction of the said solution on the carrier being moreover at ambient temperature.

Methanol can, to great advantage, be used as the organic solvent as cupric chloride is very soluble in it (about 680 g per litre at ambient temperature).

DETAILED DESCRIPTION OF INVENTION

EXAMPLE I

A methanolic solution of cupric chloride consisting of a quantity of cupric chloride comprised between 500 and 600 g is dissolved in one litre of methanol.

A porous sintered copper carrier is dipped or immersed in this solution for about one-half an hour at ambient temperature, it being possible, however, to extend this immersion time to about three quarters of an hour. The reaction which occurs during the immersion time is as follows: part of the copper forming the original porous metal carrier is corroded, by the non-aqueous cupric chloride solution to form the active material in the form of cuprous chloride in said carrier, thus providing the desired electrode.

The so-treated electrode is then removed from the non-aqueous solution and washed by an organic compound capable of dissolving the cupric chloride, for example, methanol, to remove the excess cupric chloride and then the washed electrode is dried in vacuo.

In the resulting electrode, the copper content of the active material in the form of cuprous chloride corresponds practically to about twice the corroded copper of the carrier, since this cuprous chloride comprises as much copper derived from the metallic copper as that supplied by the non-aqueous cupric chloride corroding solution.

By this method of practising the invention, in a single operation, about a third of the original copper of the original carrier becomes corroded to cuprous chloride. If this process is repeated by again immersing the electrode which has already been treated once in said non-aqueous methanolic solution, the further amount of corroded copper resulting is very slight. Thus, a repetition of several operational immersion cycles it is found produces no more than 5 percent of extra cupric chloride.

Thus, the first object of the invention is attained according to which the extent of corrosion of the copper content of the carrier to cuprous chloride is limited, although cyclic repetition of immersion can be effected. This provides a safety margin in production when the electrodes are required to have a highly conductive metallic carrier.

As only a third of the copper of the carrier has been corroded to cuprous chloride by the procedure electrodes containing practically as much copper in metal form as that contained in the cuprous chloride therein are obtained since about half the cuprous chloride of the electrode comes from the corroded copper of the carrier and about half comes from the copper contained in the non-aqueous cupric chloride corroding solution.

Moreover, the method of this described example effects attainment of the second desired object of the invention, according to which the cuprous chloride electrode contains no water, since during the process, it is never in contact with any aqueous solution.

Lastly, it should be noted that, in relation to the process described in the said U.S. Pat. No. 2,744,948 wherein boiling cupric chloride is required, the process according to the invention has the advantage of being carried out at ambient temperature.

EXAMPLE II

The porous copper carrier to be treated in the manner of Example I can be made as follows:

Copper powder in arborescent form selected from the group consisting of dendritic or acicular particles is preferably used, because such a powder has very great entangling qualities, while having a structure such that it can easily be corroded by cupric chloride. Relatively light copper powders of this type having an apparent density practically between 1 and 2, can be used. Firstly, such powder is molded into the required shape of the electrode, then the corresponding molded powder cakes are elevated to a temperature of about 700°C. for about half an hour in a reducing atmosphere. A suitable conductive support, in the form of metal gauze or of perforated metal sheets, for example, can be incorporated during molding into these electrode shapes, being located preferably in a median plane thereof. These conductive supports may advantageously be made of copper, or also can be made of copper-plated steel.

EXAMPLE III

In an alternative procedure, the copper carrier for treatment in the manner of Example I can be made as follows:

Copper powder of the same kind as in Example II is agglomerated with an organic binder. This organic binder may be selected from the group consisting of polystyrene, polyethlene, or polytetrafluoroethylene. In effecting this carrier product, the copper powder and organic binder are agglomerated and molded into desired carrier shape. This shaped carrier is then subjected to the immersion procedure in non-aqueous cupric chloride methanol solution according to the procedure of Example I. In the resultant electrode, it has been found that the corroded cuprous chloride fraction of the metal copper in the molded carrier is no longer about one-third but rather about one-fourth or one-fifth of the metal copper, thus enabling the production of electrodes having a metallic carrier of improved conductance.

The electrodes produced by the procedures of any of the Examples are of utility particularly in electrochemical generators of primary type with a lithium anode and a non-aqueous electrolyte. They are useful, too, in other known types of electrochemical generators with different anodes and electrolytes.

The invention is obviously not limited to specific Examples described, which have been presented only by way of examples. More particularly, details may be modified and certain arrangements may be changed, or certain means may be replaced by equivalent means, without departing from the scope of the invention as defined in the appended claims.

What is claimed is:

1. A method for preparing an electrode for electrochemical generators comprising providing a metallic copper containing carrier body, providing a concentrated non-aqueous solution of cupric chloride in organic solvent, immersing the metallic copper carrier into said solution at ambient temperature with resulting corrosive action of the cupric chloride on the metallic copper to provide corrosive conversion of part of the copper metal of the carrier into cuprous chloride, the remaining unconverted metallic copper of the carrier serving as a conductive current carrier for the electrode.

2. A method according to claim 1, wherein said organic solvent is an alcohol.

3. A method according to claim 2, wherein said alcohol is methanol.

4. A method according to claim 1, wherein said non-aqueous solution comprises cupric chloride and said organic solvent is methanol there being approximately 500 to 600 g per liter of cupric chloride dissolved in each liter of said methanol.

5. A method according to claim 1, wherein said metal copper containing carrier body is immersed into said non-aqueous solution maintained at ambient temperature for from about 30 to 45 minutes.

6. A method according to claim 5 wherein subsequent to immersion in said solution, the carrier body is washed in an organic compound capable of dissolving any cupric chloride existing in excess in the carrier body and said body is subsequently dried.

7. A method according to claim 6 wherein said organic compound is methanol and the drying is effected in vacuo.

8. A method according to claim 1, including the step of preparing the porous metallic copper containing carrier body from copper powder in aborescent form by molding and sintering at elevated temperature in a reducing atmosphere.

9. A method according to claim 8 including incorporation into the molded powder carrier body of a conductive support.

10. A method according to claim 9, wherein said support is located in a median plane of said carrier body, said conductive support being selected from the group consisting of perforated copper and copper plated perforated steel.

11. A method according to claim 1 including the step of preparing the metallic copper containing carrier body by mixing copper powder in arborescent form with an agglomerate and molding to carrier body shape.

12. A method according to claim 11 wherein said agglomerant is selected from the group consisting of polystyrene, polyethylene and polytetrafluoroethylene.

13. A method according to claim 11 including incorporation of a conductive metallic support into the carrier body during molding thereof.

14. A method according to claim 13 including location of the said support in a median plane of the carrier body.

* * * * *